(12) United States Patent
Knas et al.

(10) Patent No.: US 10,146,321 B1
(45) Date of Patent: Dec. 4, 2018

(54) SYSTEMS FOR INTEGRATING GESTURE-SENSING CONTROLLER AND VIRTUAL KEYBOARD TECHNOLOGY

(71) Applicant: MASSACHUSETTS MUTUAL LIFE INSURANCE COMPANY, Springfield, MA (US)

(72) Inventors: Michal Knas, Monson, MA (US); Jiby John, Suffield, CT (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 77 days.

(21) Appl. No.: 15/373,642

(22) Filed: Dec. 9, 2016

Related U.S. Application Data

(60) Provisional application No. 62/265,802, filed on Dec. 10, 2015.

(51) Int. Cl.
*G06F 3/041* (2006.01)
*G06F 3/01* (2006.01)
*G09G 3/00* (2006.01)
*G06F 3/03* (2006.01)

(52) U.S. Cl.
CPC ............ *G06F 3/017* (2013.01); *G06F 3/0308* (2013.01); *G09G 3/002* (2013.01); *G06F 2203/0384* (2013.01)

(58) Field of Classification Search
CPC ................... G06F 3/017; G06F 3/0308; G06F 2203/0384; G09G 3/002
See application file for complete search history.

(56) References Cited

U.S. PATENT DOCUMENTS

| | | | | |
|---|---|---|---|---|
| 2007/0130547 A1* | 6/2007 | Boillot | | G06F 3/017 |
| | | | | 715/863 |
| 2011/0041100 A1* | 2/2011 | Boillot | | G06F 3/011 |
| | | | | 715/863 |
| 2013/0239041 A1* | 9/2013 | DaCosta | | G06F 3/011 |
| | | | | 715/773 |
| 2014/0250245 A1* | 9/2014 | Pahud | | G06F 13/102 |
| | | | | 710/14 |
| 2017/0123554 A1* | 5/2017 | Villar | | G06F 3/0416 |

* cited by examiner

*Primary Examiner* — Jonathan Boyd
(74) *Attorney, Agent, or Firm* — Eric L. Sophir; Dentons US LLP

(57) ABSTRACT

The systems described herein integrate virtual keyboard technology and gesture-based controllers into a single module or into a laptop or other mobile computing device in order to make laptops, personal computers, and other mobile computing devices more convenient, more versatile, and with less clutter or fewer peripheral devices than is typically the case with a traditional combination of a physical keyboard with a mouse, touchpad, or track ball. Users of the embodiments disclosed herein will be able to enter data or commands merely by typing or making hand gestures or hand movements, which will lead to greater flexibility, creativity, and productivity, while reducing user ennui and fatigue.

17 Claims, 6 Drawing Sheets

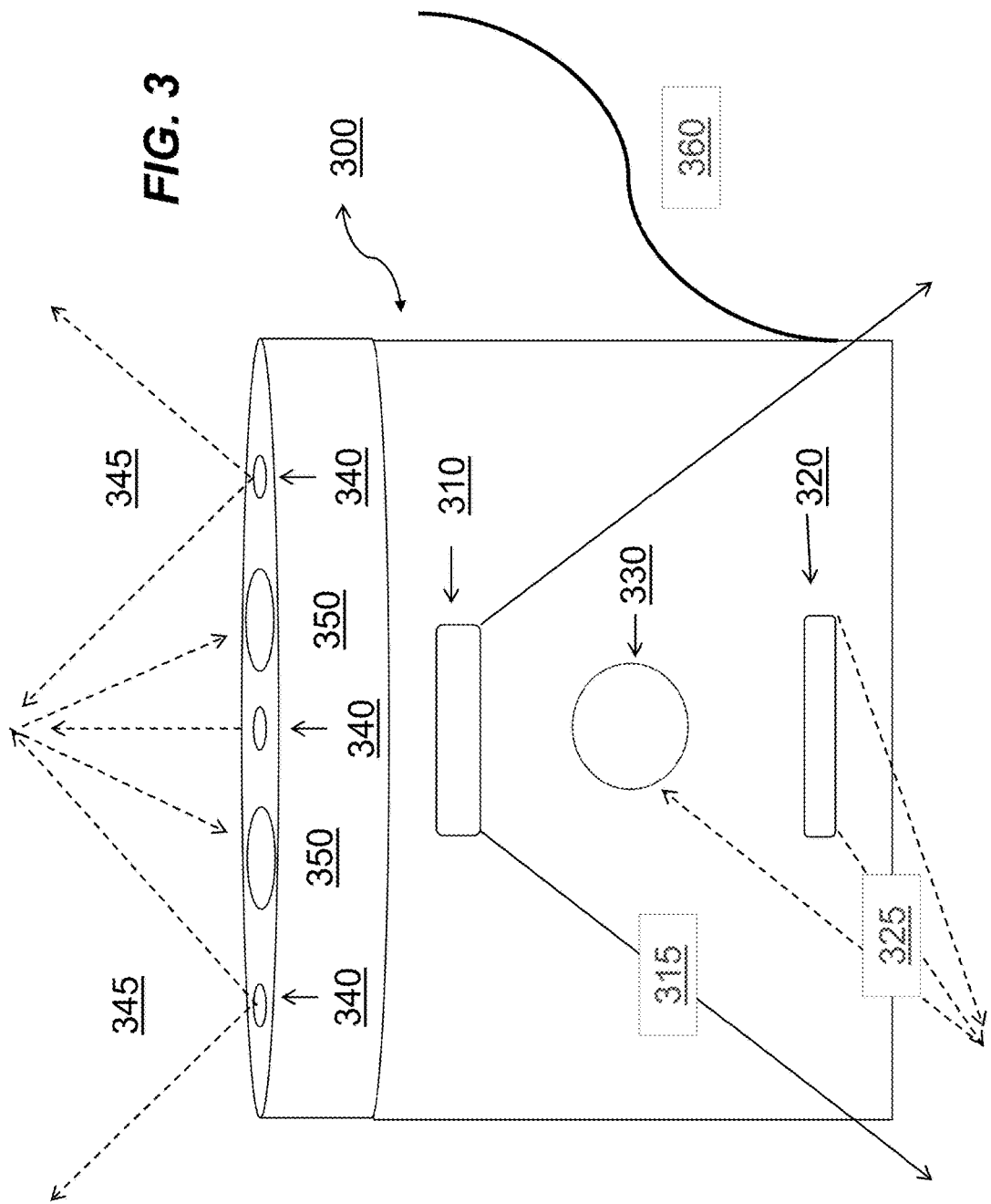

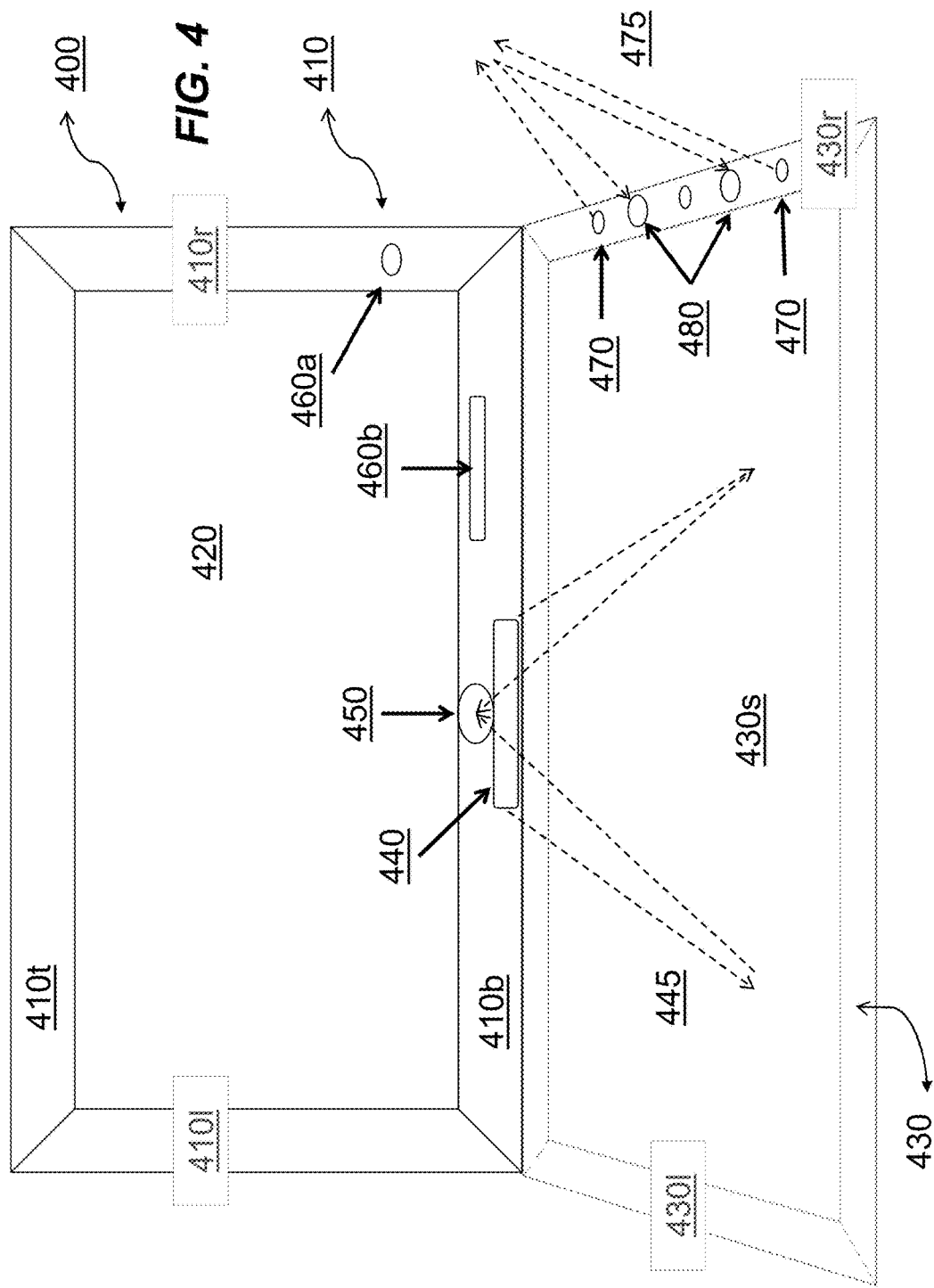

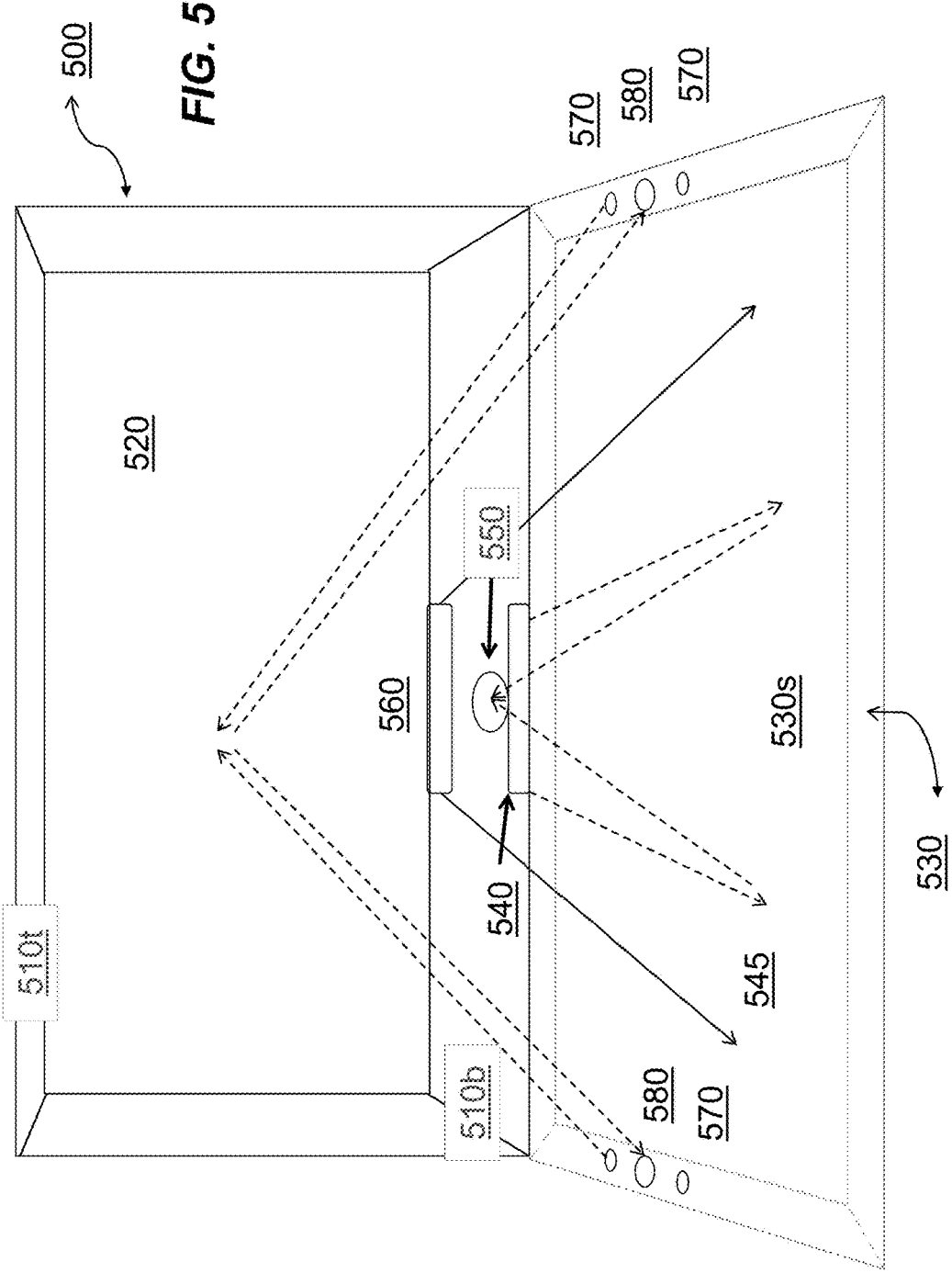

SYSTEMS FOR INTEGRATING GESTURE-SENSING CONTROLLER AND VIRTUAL KEYBOARD TECHNOLOGY

CROSS REFERENCE TO RELATED APPLICATION

This application claims priority to U.S. Provisional Patent Application Ser. No. 62/265,802, filed on Dec. 10, 2015, which is hereby incorporated by reference in its entirety.

FIELD OF DISCLOSURE

The present invention relates to systems that integrate virtual keyboard technology with a gesture-sensing controller to facilitate operation of a personal computer, laptop, or other mobile computing device.

BACKGROUND

Personal computing devices, whether in the form of personal computers, laptops, smart phones, gaming devices, liquid crystal display (LCD) televisions with gaming consoles, have become so common in everyday life that they are almost an essential part of a user's experience in the workforce, at home, on travel, or in other places or other occasions. Personal computing and processing powers have become more powerful, more flexible, and more dynamic as users today can take advantage of software applications ranging from work-related word processing, spreadsheets, presentations, and financial and tax preparation software to photo and video storage and editing, graphics, research, mapping, and increasingly sophisticated gaming applications, to name only a few of the many applications available today.

As personal computing has grown more ubiquitous and their applications more diverse, so have the means of inputting, editing, and controlling information into personal computing devices. Most users still largely rely on physical keyboards, which are connected by wire or wirelessly to the personal computing device. Keyboards are relatively simple, reliable, generally inexpensive, and somewhat ergonomically designed devices, which operate by closing a switch each time a particular key is pressed and transmitting the data or function corresponding to that key to the personal computing device. Traditional keyboards have a number of disadvantages; for example, keyboards take up space on the user's workspace, add weight to laptops and other mobile computing devices, and, when integrated into a laptop or other mobile computing device, can seriously degrade the mobile computing device if exposed to moisture or experience other damage. Touchscreen keypads may offer a lightweight alternative for some smart phones, tablets, and other mobile devices, but they are unlikely to entirely replace the need for a separate keyboard or input device of some kind. Touchscreens require typing on the display itself, are fragile, and can degrade with use. Furthermore, touchscreen keyboard may not properly operate in certain temperatures or humidity, or in instances where users have wet fingers or wearing gloves.

Mobile computing devices typically include a mouse, touchpad, trackball, or similar device to supplement the use of a keyboard. A mouse, for example, can be used to facilitate scrolling, rapidly moving the cursor to a desired location, selecting or moving objects, and helpful functions. However, a mouse or touchpad has limited functionality, and cannot replace the broad range of keys or commands that can be input through a keyboard.

Other, sensor-based input devices are also becoming increasingly common. One example is the virtual keyboard, which uses sensors to detect and interpret hand movements over a laser-projected "keyboard," so that the user can input letters, numbers, and functions just as if he or she were using a physical keyboard. Another example is the Leap Motion Controller®, which uses lasers, stereoscopic cameras, and motion detection software to detect and interpret hand movements and gestures. Those hand movements can be used, for example, for scrolling through pages or applications, selecting specific functions, moving images on a liquid crystal display, or playing games, to name a few examples. Microsoft's Kinect® uses cameras to detect the user's hand gestures or facial or body movements, and processors and algorithms to interpret and input those gestures or movements into a gaming or other application in a meaningful way. Microphones and voice recognition software are also available for detecting and interpreting speech for inputting data, words, or commands.

As helpful as each of these input devices may be individually, the proliferation of these input devices can complicate the user's experience and clutter his or her limited workspace. This is particularly the case if the user is traveling, or even if he or she wishes to move her laptop from one room to another at work or at home.

SUMMARY

For the aforementioned reasons a system for integrating different input devices would improve the convenience, portability, ease, and flexibility of personal computing while reducing user ennui or fatigue. Disclosed herein are methods and software applications for addressing the shortcomings of the art, and may provide any number of additional or alternative advantages. The systems described herein integrate virtual keyboard technology with a gesture-sensing controller to facilitate operation of a personal computer, laptop or other mobile device.

Numerous other aspects, features, and benefits of the present disclosure may be made apparent from the following detailed description taken together with the drawing figures. It should be further understood that both the foregoing general description and the following detailed description are exemplary and explanatory and are intended to provide further explanation of the invention as claimed.

In some embodiments, the virtual keyboard system and gesture-based controller are integrated into a single modular device, which can be connected to a laptop, personal computer, or other mobile device. The front portion of the module includes a laser diode assembly for projecting the virtual keyboard, an infrared laser diode assembly, a CMOS sensor for detecting the reflected IR light, and a processor for identifying the virtual keys typed by the user and transmitting that data or command to the laptop or personal computer. On the top portion of the module are located a plurality of infrared light-emitting diodes and stereoscopic cameras for illuminating and detecting the user's hands when they are raised above the module, and interpreting the user's hand gestures or motions, and transmitting these data or commands to the laptop, personal computer, or mobile device. By integrating the virtual keyboard technology and gesture-based controller into different portions of a single modular device, the module offers greater ease of use, more convenience, less clutter, and more flexibility than a traditional collection of keyboards, mouse or touchpad, or other input devices.

In other embodiments, the virtual keyboard technology and gesture-based controller are integrated into a laptop or mobile device. In an exemplary embodiment, the IR laser diode assembly and CMOS sensor are positioned below the liquid crystal display in the upper portion of a laptop, and are calibrated to sense the locations of the virtual keys represented on the upper surface of the lower portion of the laptop. In another embodiment, a laser diode assembly is located on the lower edge or either side edge of the upper portion of the laptop to project a virtual keyboard onto the smooth upper surface of the lower portion. In an exemplary embodiment, the gesture-based controller is integrated into lower portion of the laptop, e.g., along the right or left edge, so that the user may use the controller primarily when his or hands are above and toward the side of the laptop. In another exemplary embodiment, a plurality of IR LEDs and a stereoscopic camera are positioned on each of the right and left edges of the lower portion of the laptop, and are oriented so that the user may use the gesture-based controller primarily by raising his or her hands directly above the keyboard. In each embodiment, the user can alternate between using the virtual keyboard and the gesture-based controller merely by moving his or hands up or down, or side to side, in relation to the lower surface of the laptop. By integrating the virtual keyboard technology and gesture-based controller into the laptop or personal computer in this manner, the laptop may be lighter, easier and more convenient to use, and more durable than a traditional laptop with a physical keyboard and mouse, track ball, or touchpad combination.

Numerous other aspects, features, and benefits of the present disclosure may be made apparent from the following detailed description taken together with the drawing figures. It should be further understood that both the foregoing general description and the following detailed description are exemplary and explanatory and are intended to provide further explanation of the invention as claimed.

BRIEF DESCRIPTION OF THE DRAWINGS

The present disclosure can be better understood by referring to the following figures. The components in the figures are not necessarily to scale. The emphasis is instead placed upon illustrating the principles of the disclosure. In the figures, reference numerals designate corresponding parts throughout the different views.

FIG. 3 illustrates an exemplary embodiment of a module that incorporates a virtual keyboard with a laser-based gesture controller for use with a personal computer, laptop, or other mobile device.

FIG. 4 illustrates an exemplary embodiment of a module of a laptop that integrates a virtual keyboard with a laser-based gesture controller.

FIG. 5 illustrates an exemplary embodiment of a module of a laptop that integrates a virtual keyboard with a laser-based gesture controller.

DETAILED DESCRIPTION

Figure 1A:
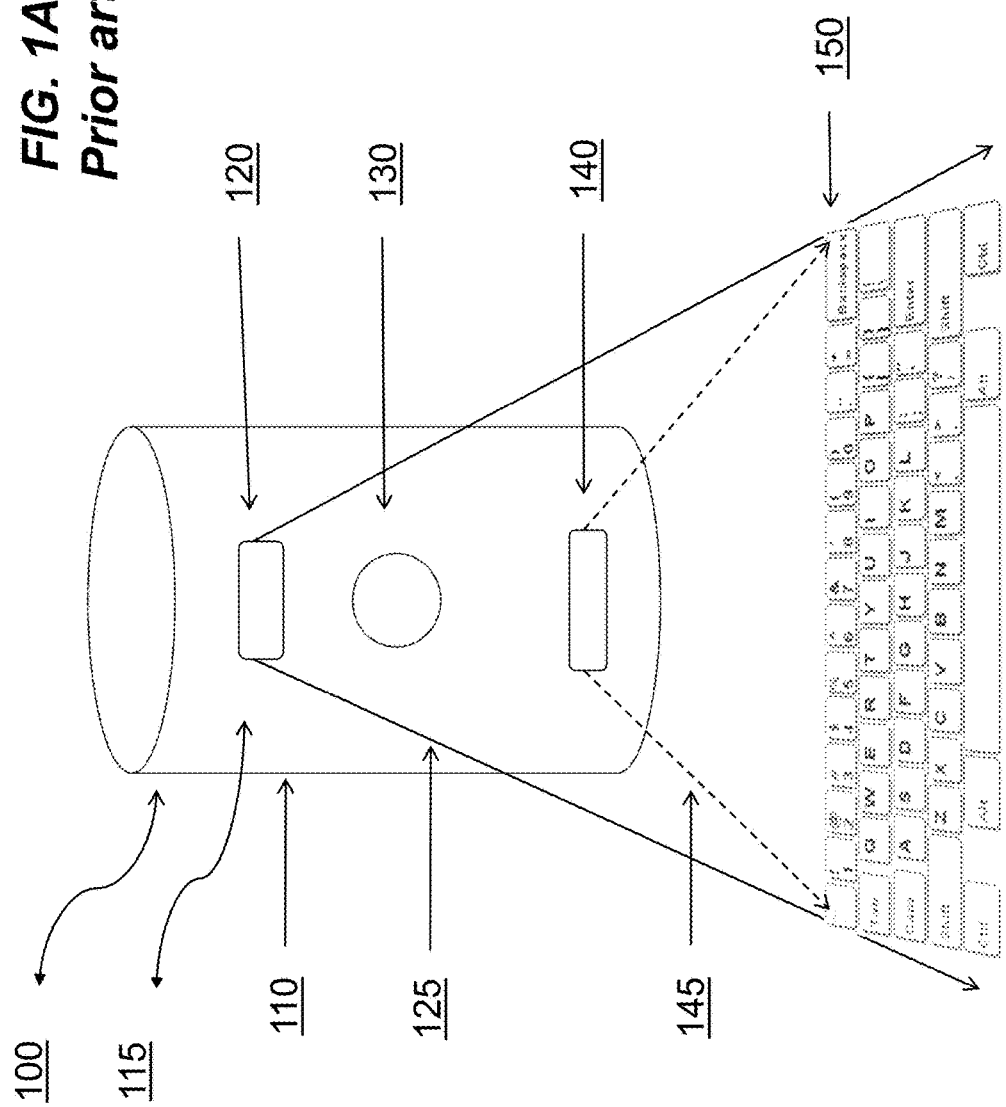
FIG. 1A illustrates a system in the prior art for projecting and using a virtual keyboard user laser projection and detection sensors.

The present disclosure is described here in detail with reference to embodiments illustrated in the drawings and specific language used to describe the same. Other embodiments may be used and/or other changes may be made without departing from the spirit or scope of the present disclosure. The illustrative embodiments described in detail here as offered as examples only, and are not meant to be limiting of the subject matter presented here. Alterations and further modifications of the inventive features illustrated here, and additional applications of the principles of the inventions as illustrated here, which would occur to one skilled in the relevant art and having possession of this disclosure, are to be considered within the scope of the invention.

Figure 1B:
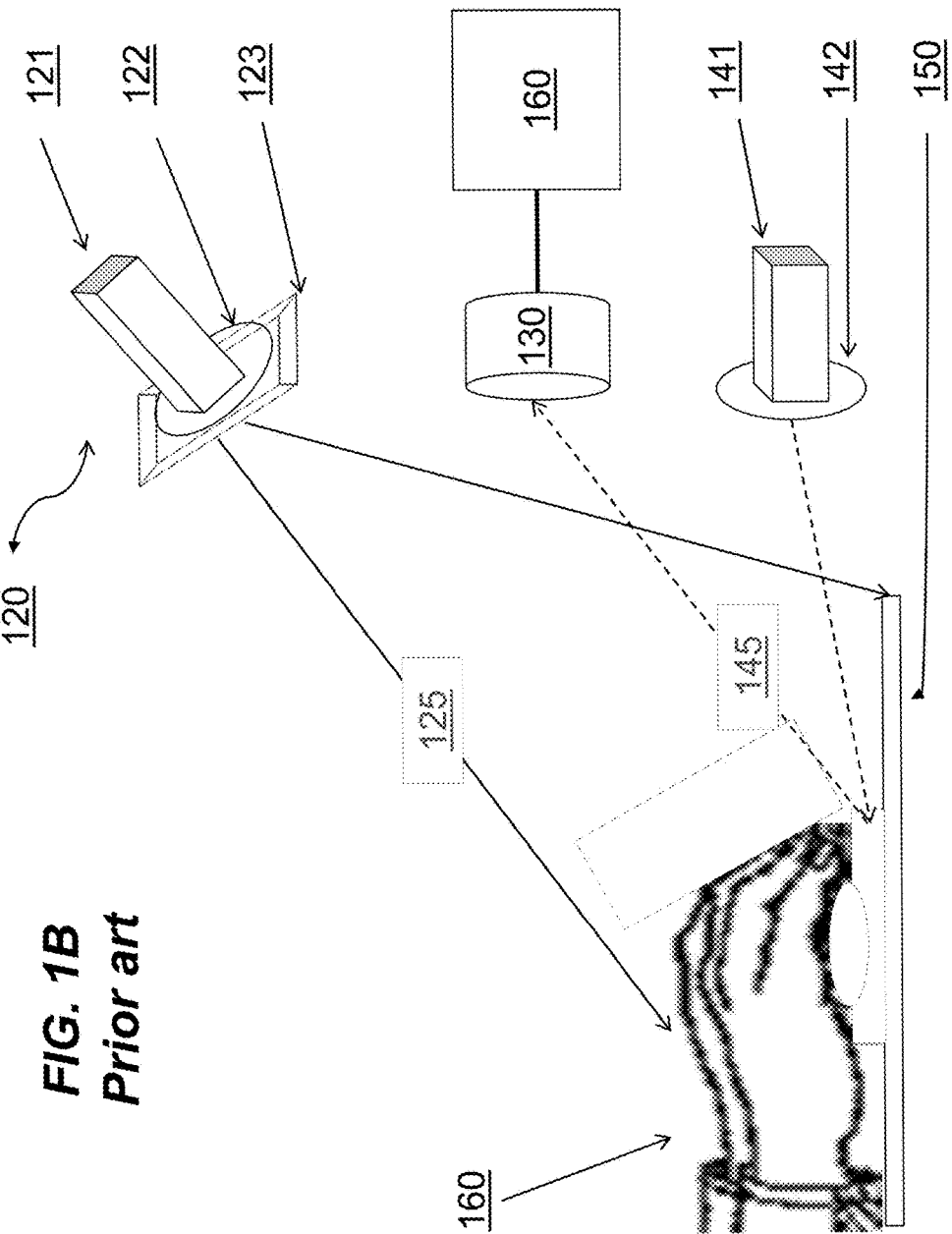
FIG. 1B illustrates the basic components of a prior art system for projecting and using a virtual keyboard.

A system for integrating a virtual keyboard and gesture-based controller are disclosed herein. An exemplary embodiment of a prior art virtual keyboard technology 100 is set forth in FIGS. 1a and 1b. The virtual keyboard technology includes a housing 110 with a front portion 115 that substantially faces the user and contains the following basic components. First, a laser diode assembly 120 is located in the front portion 115 and positioned approximately 5-10 cm above the surface of the user's desk or workspace. The laser diode assembly 120 includes a laser diode 121 that projects visible light 125, typically red or green, through optics 122 to focus the laser light onto the user's desk or workspace. The laser light 125 passes through a diffractive optical element DOE 123 that bears a minute, scaled image of the keyboard. As a result, the laser diode assembly projects an image of a keyboard 150, or virtual keyboard (e.g., a QWERTY keyboard), onto the surface of the desk. The dimensions of this virtual keyboard 150 approximate those of a physical keyboard (e.g., approximately 10-15 cm wide and 25-30 cm long) so that the user may type comfortably. This laser diode assembly is optional, however, and may be replaced by a representation of the keyboard on the surface of the desk that is scaled for use with the CMOS sensor, discussed below.

Positioned underneath the first laser diode 121 is a second laser diode assembly 140, which includes an infrared (IR) laser diode 141 and optics 142 for focusing the IR laser light 145 from the laser diode 141. This IR laser diode assembly 140 projects the IR light beam 145 parallel to the surface of the user's desk, a few millimeters above the surface of the desk. As the user types on the virtual keyboard 150, his or her fingers 160 interrupt the IR light beam 145, which is reflected back and detected by a CMOS (complementary metal oxide semiconductor) sensor 130. The CMOS sensor 130 includes processor 160, such as a Virtual Interface Processing Core, which determines the location of the user's fingers 160 in 3D space in real-time, correlates this location to a specific key on the virtual keyboard 150, and transmits this information to the personal computer (not shown). This processor 160 may detect and interpret multiple light reflections simultaneously (e.g., as when the user types the SHIFT key and a letter simultaneously to enter a capital letter).

Figure 2:
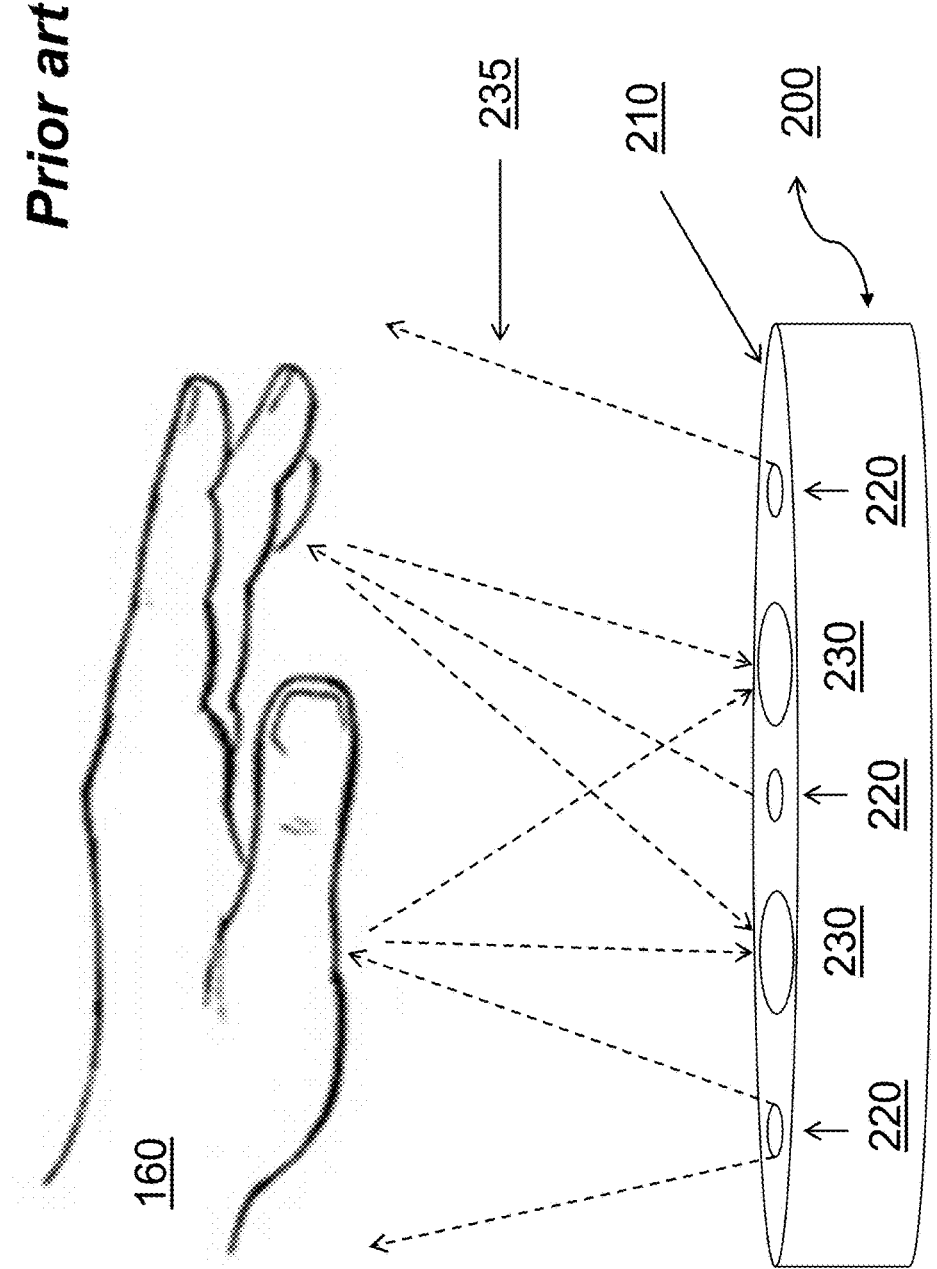
FIG. 2 illustrates a prior art system for detecting and interpreting hand gestures and movements for inputting data and controlling a personal computer, laptop, or other mobile device.

The prior art also includes a gesture-based controller 200 with cameras and a processor for detecting and identifying hand gestures or hand movements by the user for entering data or commands into the computer. In the exemplary embodiment depicted in FIG. 2, a plurality of laser light-emitting diodes (LEDs) 220 are located on the top portion 210 of the gesture-based controller 200 to project infrared (IR) light 235 substantially upward from the controller 200. These IR LEDs 220 illuminate the lower surfaces of the user's hands 160 when they are raised above the controller 200. The IR light is reflected back and detected by two cameras 230, which provide stereoscopic images of the user's hands 160 above the controller. Inside the controller are processors and software (not shown) that can recognize different gestures, such as pointing, waving or sliding the hand from side to side, pinching, rotating, and other gestures, to name only a few. The Leap Motion Controller®, for example, applies complex algorithms to the raw data streamed from the cameras 230 to reconstruct a 3D representation of what the controller 200 sees, while compensating for extraneous background objects and ambient lighting. The software then extracts images of the user's hands and fingers 160. The images, expressed as a series of frames containing all of the tracking data, are then fed into a transport protocol for interaction with the display to create gesture-controlled data and command input.

FIG. 3 illustrates an exemplary embodiment of a module 300 that integrates a virtual keyboard with a gesture-based controller. A plurality of IR laser LEDs 340 is located on the top surface of the module 300 to project IR light 345 upward and illuminate the under surface of the user's hands when they are raised above the module 300. The IR light is reflected off the user's hands and detected by a plurality of stereoscope cameras 350, which capture images of the user's hands and transmit the image data to a processor (not shown) for interpretation. For example, a sweeping motion from left to right may be used to swipe pages of a document or move through applications on the home page. Or, an up or down motion may be used to scroll through a document, or a flick of a fingertip may be used for rapid scrolling. Pointing may be used to move the cursor or to block text, or a pinching gesture may be used to expand or shrink the image on the screen, to name only a few. Some of these gestures may replace the functions previously performed by a mouse or touchpad. This would obviate the need for a separate mouse or similar input device, and thereby conserve space on the user's workspace while expanding the range of available commands and improving ease of use.

The module 300 also includes a laser diode assembly 310, which is oriented to project visible light (e.g., red or green) downward toward the surface of the user's workspace in front of the user. This laser diode assembly projects light through a diffractive optical element (not shown) bearing an image of a keyboard, and a lens to focus the image of a full-sized keyboard onto the surface of the workspace. The module 300 also includes an infrared laser diode 330 on the front surface and near the bottom of the device, so that the IR laser diode 320 projects IR light 325 only a few millimeters above and parallel to the surface of the desk. The front surface also includes a CMOS sensor chip 330 for detecting IR light 325 reflected from the user's hands as he or she is typing on the virtual keyboard. The module 300 also includes a processor to determine the location of an intended keystroke on the virtual keyboard in real-time, correlate the key stroke to a particular key or command (e.g., a, b, c . . . 1, 2, 3, etc.). By positioning the laser diode assembly 310, IR laser diode 320, and CMOS sensor chip 330 on the front surface of the module 300, below the gesture-controlled apparatus on the top surface, the module creates two separate areas for inputting information: (1) a lower region located on or slightly above the desktop for entering information through the virtual keyboard; and (2) an upper region above the module for entering gesture-controlled information and commands. These two controllers will not interfere with one another due to their separate positions with respect to the module 300. The module 300 may communicate wirelessly to the personal computing or by wire, such as a USB connection 360.

Another exemplary embodiment is illustrated in FIG. 4, in which the virtual keyboard assembly and gesture-sensing controller are integrated into a laptop 400 or other mobile device for convenience and portability. The laptop 400 is hinged to open into two portions of approximately equal dimensions: (1) an upper portion 410 containing a liquid crystal display 420, light source, and related electronics; and (2) a lower portion 430 that typically includes the motherboard, processor, graphics card, fan, and typically a CD/DVD disk drive and USB ports, among other things. In this embodiment, however, the lower portion 410 does not include a physical keyboard, touchpad, track ball, or similar input device. Instead, the lower portion is covered with a substantially smooth upper surface 430s designed for use with a virtual keyboard assembly. Replacing the keyboard, touchpad, and track ball with a virtual keyboard assembly may make the laptop lighter or thinner, save space for other components in the lower portion of the laptop, and may make the laptop more durable and less sensitive to spills, moisture, or other potential damage.

In an exemplary embodiment of FIG. 4, the IR laser diode assembly 440 and CMOS sensor 450 are located in the lower portion 410b of the frame surrounding the LCD display 420. From that position, the IR laser diode assembly 440 can project IR light 445 a few millimeters above the upper surface 430s of the lower portion 430. In this embodiment, the upper surface 430s is slightly etched to indicate the positions of the virtual keys. The IR laser diode assembly 440 and CMOS sensor 450 are calibrated to detect the user's fingers as they touch the individual keys. (The IR laser diode assembly 440 and CMOS sensor 450 may need to be recalibrated when the laptop is opened to ensure they are properly detecting the virtual keystrokes.) This etched keyboard surface 430s replaces the need for a separate laser diode, DOE, and lens assembly for projecting a virtual keyboard, given the shortage of space on the frame surrounding the upper portion 410 of the laptop 400. This embodiment would reduce power consumption and extend the battery life of the laptop 400 because the virtual keyboard is not projected by a laser diode.

If a laser-projected virtual keyboard is desired, however, FIG. 4 illustrates an exemplary embodiment in which the laser diode, DOE, and lens assembly 460a may be located to the one side of the LCD display 420 (e.g., the right side 410r), or to one side (e.g., the right side) of the IR laser diode 440 and CMOS sensor 450, with appropriate optics for focusing the laser beam to project the virtual keyboard onto the upper surface 430s of the lower portion 430 of the laptop 400. FIG. 5 illustrates another exemplary embodiment, in which the liquid crystal display 520 is repositioned closer to the top portion 510t of the frame surrounding the LCD 520. This may create sufficient space in the bottom portion 510b of the frame to accommodate the laser diode assembly with DOE 560 for projecting the virtual keyboard, the IR laser diode 540, and the CMOS sensor 550.

Returning to the exemplary embodiment in FIG. 4, the gesture-control assembly is integrated into the bottom portion 430 of the laptop 400, preferably along the right or left edge, so that it does not interfere with the operation of the virtual keyboard or the user's view of the liquid crystal display 420. The gesture-sensing controller includes a plurality of IR LEDs 470 to project IR light generally upward and toward the side to illuminate the user's hands above the controller. A plurality of stereoscopic cameras 480 detects the user's hand movements, as described earlier. By means of this arrangement, the user can generally use his or her hands off to the side of the display, as a user may use a mouse, albeit with greater functionality. FIG. 5 illustrates an alternative embodiment, in which IR LEDs 570 are located in both the right and left edges of the lower portion 530 of the laptop 500, and angled to project generally upward and over the lower surface 530a. The stereoscopic cameras 580 are likewise divided, with one camera 580 located in each of the right and left edges of the lower portion 530 of the laptop 500. By means of this arrangement, the user can more accurately use his or her hands above the keyboard to more easily or more closely coordinate his or her hand movements with the display 520. Spacing the cameras 580 apart in this manner may also lead to a more accurate 3D interpretation of the hand movements, which may lead to more accurate gesture-based control.

By positioning the virtual keyboard assembly and gesture-control assembly according to any of these embodiments, the user can use the virtual keyboard for typing, and then use the gesture-control assembly simply by raising his or her hands above the surface of the lower portion, without the two input assemblies interfering with one another. This ability to control the computer and input data simply by raising and lowering one's hands is also more natural and convenient than typing, stopping, reaching for a mouse or touchpad, and then resuming typing. Integrating a virtual keyboard and gesture-sensing controller according to any of these embodiments will also provide the user with a greater variety of options for inputting data and controlling his or her personal computer, laptop, or mobile device than a traditional keyboard plus mouse/touchpad combination. This variety may boost creativity and productivity while reducing user ennui and fatigue.

Any reference to claim elements in the singular, for example, using the articles "a," "an" or "the," is not to be construed as limiting the element to the singular. The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A system for using hand movements for entering information and commands into a computing device comprising:
   a module having a housing with a bottom portion and a front portion, the module comprising:
      a laser diode configured for projecting visible light from the front portion onto a surface positioned substantially in front of said module;
      a diffractive optical element positioned in front of said laser diode and configured for bearing an image of a keyboard, so that a scaled-up image of said keyboard is projected by said laser diode onto said surface, said image of the keyboard comprising a plurality of key images each corresponding to an individual region of said surface;
      an infrared laser diode positioned to project infrared light substantially parallel to said surface at a first height above said surface, whereby the first height corresponds to a typing region at and above the surface where a user interacts with the image of the keyboard;
      a complementary metal oxide semiconductor sensor configured for detecting first infrared light reflected back from each of said individual regions corresponding to each of said key images and for transmitting image data of said reflected infrared light to a first processor, the first infrared light being reflected back as a result of the user's hand movements at the typing region between the surface and the first height; and
      said first processor having first software configured for interpreting said image data from a key region, identifying the key image corresponding to said image data, and transmitting said key identifying information to said computing device;
   said bottom portion below the first height, the bottom portion comprising:
      a plurality of infrared light-emitting diodes oriented for projecting second infrared light substantially at a gesture region between the first height and a second height above the image of the keyboard on said surface;
      a plurality of stereoscopic cameras configured for detecting said second infrared light reflected as a result of the user's hand movements in the gesture region and transmitting second image data from said reflected second infrared light to a second processor; and
      said second processor having second software configured for interpreting said second image data from said hand movement as a gesture, identifying any command or data information corresponding to said image data from said gesture, and transmitting said command or data information to said computing device.

2. The system of claim 1, further comprising:
said first infrared light is reflected back from said individual region corresponding to said key image by said user's hand or one or more of said user's fingers.

3. The system of claim 1, further comprising:
said first processor and said second processor are part of the same processing chip.

4. The system of claim 1, further comprising:
said computing device includes a laptop, personal computer, mobile phone, tablet, or other mobile computing device.

5. The system of claim 1, further comprising:
a USB cable to connect the module to the computing device.

6. The system of claim 1, further comprising:
a wireless connection, such as Bluetooth, to connect the module to the computing device.

7. A system for integrating a virtual keyboard and gesture-based controller into a mobile computing device, said system comprising:
   a mobile computing device having an upper portion with a frame around a liquid crystal display, said frame including a left edge portion, a right edge portion, and bottom edge portion;
   said mobile computing device having a lower portion with a first surface, said lower portion being connected to said upper portion;

said upper portion containing:
- an infrared laser diode located in said bottom edge portion and positioned to project first infrared light substantially parallel to said first surface of said lower portion;
- complementary metal oxide semiconductor sensor located in said bottom edge portion and positioned to detect first infrared light reflected back from an individual region of said first surface of said lower portion and for transmitting image data of said reflected infrared light to a first processor;
- said first processor having first software configured for interpreting said image data from said individual region, identifying the individual region corresponding to said image data, and transmitting region identification information to said mobile computing device;

said lower portion containing:
- a plurality of infrared light-emitting diodes oriented for projecting second infrared light substantially upward from said first surface of said lower portion;
- a plurality of stereoscopic cameras oriented substantially upward and configured for detecting second infrared light reflected from an object positioned substantially above said first surface and transmitting second image data from said reflected second infrared light to a second processor; and
- said second processor having second software configured for interpreting said second image data, identifying any command or data information corresponding to said image data, and transmitting said command or data information to said mobile computing device.

8. The system of claim 7, further comprising:
said mobile computing device includes a laptop, netbook, or other portable computer.

9. The system of claim 7, further comprising:
said surface of said lower portion having an image of a keyboard etched or displayed thereon, said keyboard having individual key images in individual regions of said surface;
said complementary metal oxide semiconductor sensor being capable of detecting first infrared light reflected from each individual region corresponding to each key image in said keyboard; and
said first processor having said first software for identifying the individual region corresponding to each key image in said keyboard when said first infrared light is reflected from an individual key region, and transmitting key region identification information to said first processor.

10. The system of claim 9, further comprising:
said first infrared light is reflected back from said individual region corresponding to said key image by said user's hand or one or more of said user's fingers.

11. The system of claim 7, further comprising:
said object includes said user's hand or one or more said user's fingers.

12. The system of claim 7, further comprising:
a laser diode for projecting visible light onto said surface of said lower portion, said laser diode being located in said frame of said upper portion;
a diffractive optical element positioned in front of said laser diode and bearing an image of a keyboard, so that a scaled-up image of said keyboard is projected by said laser diode onto said surface of said lower portion, said image of the keyboard comprising a plurality of key images each corresponding to an individual region of said surface;
said complementary metal oxide semiconductor sensor being capable of detecting infrared light reflected from each of said individual regions corresponding to each of said key images in said keyboard; and
said first processor having said first software for identifying the individual region corresponding to an individual key image when said infrared light is reflected from said individual region, and transmitting identification information to said first processor.

13. The system of claim 12, further comprising:
said laser diode and said diffractive optical element being located in a left edge portion or a right edge portion of said upper portion.

14. The system of claim 12, further comprising:
said laser diode and diffractive optical element being located in the bottom edge portion of said upper portion.

15. The system of claim 7, further comprising:
said plurality of infrared light-emitting diodes and said plurality of stereoscopic cameras being located in an edge portion of said surface of said lower portion.

16. The system of claim 15, further comprising:
said edge portion being located to right or left of said virtual keyboard.

17. The system of claim 7, further comprising:
a first plurality of said infrared light-emitting diodes and a first camera being located in a first edge portion of said lower portion to the left of said virtual keyboard; and
a second plurality of said infrared light-emitting diodes and a second camera being located in a second edge portion of said lower portion to right of said virtual keyboard.

* * * * *